(12) United States Patent
Agarwalla et al.

(10) Patent No.: US 10,769,620 B2
(45) Date of Patent: Sep. 8, 2020

(54) SYSTEM FOR MAKING AN ELECTRONIC PAYMENT TRANSACTION

(71) Applicant: MASTERCARD ASIA/PACIFIC PTE. LTD., Singapore (SG)

(72) Inventors: Sachin Agarwalla, Pune (IN); Bhaskara Dantuluri, Woodcroft (AU)

(73) Assignee: Mastercard International Incorporated, Purchase, NY (US)

( * ) Notice: Subject to any disclaimer, the term of this patent is extended or adjusted under 35 U.S.C. 154(b) by 62 days.

(21) Appl. No.: 15/892,937

(22) Filed: Feb. 9, 2018

(65) Prior Publication Data
US 2018/0225657 A1 Aug. 9, 2018

(30) Foreign Application Priority Data
Feb. 9, 2017 (SG) .............. 10201701042T

(51) Int. Cl.
*G06Q 20/36* (2012.01)
*G06Q 20/20* (2012.01)
(Continued)

(52) U.S. Cl.
CPC ........ *G06Q 20/363* (2013.01); *G06Q 20/027* (2013.01); *G06Q 20/12* (2013.01); *G06Q 20/206* (2013.01); *G06Q 20/3674* (2013.01)

(58) Field of Classification Search
CPC ........ G06Q 30/00; G06Q 30/06; G06Q 10/00; G06Q 20/32; G06Q 20/36; G06Q 20/10;
(Continued)

(56) References Cited

U.S. PATENT DOCUMENTS

| 2006/0143091 A1* | 6/2006 | Yuan | G06Q 30/0601 |
| | | | 705/26.1 |
| 2008/0208762 A1* | 8/2008 | Arthur | G06Q 20/20 |
| | | | 705/79 |

(Continued)

*Primary Examiner* — Olusegun Goyea
(74) *Attorney, Agent, or Firm* — Hovey Williams LLP

(57) ABSTRACT

Disclosed herein is a computer system for making an electronic payment transaction. The system comprises a checkout server and a virtual wallet server. The checkout server and virtual wallet server each comprise at least one processor and at least one memory including computer program code. The computer program code of the checkout server and the virtual wallet server collectively configure the computer system to, with the respective at least one processor, receive, at the checkout server, a checkout request and enable payment for the electronic payment transaction using a virtual wallet registered on the virtual wallet server, the virtual wallet comprising a payment vehicle having a payment vehicle identifier comprising a number of characters for uniquely identifying the payment vehicle. The computer program code is further configured to cause the computer system to receive a virtual wallet identifier at the virtual wallet server, the virtual wallet identifier identifying the virtual wallet, send shopping cart details including a shopping cart value from the checkout server to the virtual wallet server, transmit, from the virtual wallet server to the checkout server, payment data comprising a proper subset of the characters from which the payment vehicle identifier can be inferred and receive a payment confirmation at the checkout server, confirming payment for the electronic payment transaction should be made using the payment vehicle. That payment confirmation is then sent to the virtual wallet server, and payment is processed for the shopping cart value using the payment vehicle.

19 Claims, 6 Drawing Sheets

(51) Int. Cl.
*G06Q 20/12* (2012.01)
*G06Q 20/02* (2012.01)

(58) Field of Classification Search
CPC ........ G06Q 20/08; G06Q 20/34; G06Q 10/06; G06Q 30/02
USPC ...... 705/26.8, 14.47, 1.1, 77, 79, 41, 40, 18, 705/26.1; 1/1; 455/406, 411
See application file for complete search history.

(56) References Cited

U.S. PATENT DOCUMENTS

| | | | | |
|---|---|---|---|---|
| 2009/0124234 | A1* | 5/2009 | Fisher | H04W 4/80 455/406 |
| 2009/0132362 | A1* | 5/2009 | Fisher | G06Q 30/04 705/14.47 |
| 2009/0144161 | A1* | 6/2009 | Fisher | G06Q 20/325 705/16 |
| 2013/0110658 | A1* | 5/2013 | Lyman | G06Q 20/327 705/18 |
| 2013/0346302 | A1* | 12/2013 | Purves | G06Q 30/04 705/40 |
| 2014/0279474 | A1* | 9/2014 | Evans | G06Q 20/40 705/41 |
| 2015/0026049 | A1* | 1/2015 | Theurer | G06Q 20/405 705/41 |
| 2016/0247141 | A1* | 8/2016 | Graylin | G06Q 20/40145 |
| 2016/0260084 | A1* | 9/2016 | Main | G06Q 20/3674 |
| 2016/0379297 | A1* | 12/2016 | Aspholm | G06Q 20/3276 705/26.8 |
| 2019/0050770 | A1* | 2/2019 | Galvin | G06Q 10/1057 |
| 2019/0156381 | A1* | 5/2019 | Galvin | G06Q 30/0226 |

\* cited by examiner

SYSTEM FOR MAKING AN ELECTRONIC PAYMENT TRANSACTION

CROSS-REFERENCE TO RELATED APPLICATIONS

This application claims the priority of Singapore Application Serial No. 10201701042T, filed Feb. 7, 2017, which is incorporated herein by reference in its entirety.

TECHNICAL FIELD

The present disclosure relates to electronic payment transactions, systems for performing those transactions and computer processes performed on such systems.

BACKGROUND

Recently, virtual or digital wallets have started taking the place of physical credit and debit cards in performing cashless transactions. Virtual wallets store personal details of the owner of the virtual wallet, and details of payment vehicles for use in transactions. Accordingly, virtual wallets can be used to purchase items in-store or online, e.g. using a computer or smartphone and to authenticate the user's credentials. For example, the virtual wallet can verify the age of the user for a purchase of alcohol.

Current virtual wallets face certain drawbacks when integrating with a merchant's payment terminal. One drawback is that virtual wallets are required to provide sensitive personal information, for example a permanent account number of the user or payment vehicle identifier (e.g. credit or debit card number or account number) of a payment vehicle (e.g. credit or debit card, or bank account), to the merchant during an electronic payment transaction. Merchants may not want to handle such sensitive information which may otherwise add burden to the merchant due to the cost of compliance with standards for receiving that information. The specified payment gateways of the merchant may also be difficult to integrate with the virtual wallet.

Another shortcoming of current virtual wallets is that the process for onboarding (i.e. registering) new merchants can be tedious. The variety of shopping cart plug-ins used by different merchants also pose a problem when integrating with current virtual wallets.

A need therefore exists to provide a method and system for making an electronic payment transaction that seeks to address at least some of the above problems.

SUMMARY

The present disclosure provides a computer system for making an electronic payment transaction, the system comprising:
  a checkout server; and
  a virtual wallet server;
  the checkout server and virtual wallet server each comprising:
  at least one processor; and
  at least one memory including computer program code;
  the computer program code of the checkout server and the virtual wallet server collectively configure the computer system to, with the respective at least one processor:
    receive, at the checkout server, a checkout request;
    enable payment for the electronic payment transaction using a virtual wallet registered on the virtual wallet server, the virtual wallet comprising a payment vehicle having a payment vehicle identifier comprising a number of characters for uniquely identifying the payment vehicle;
    receive a virtual wallet identifier at the virtual wallet server, the virtual wallet identifier identifying the virtual wallet;
    send shopping cart details including a shopping cart value from the checkout server to the virtual wallet server;
    transmit, from the virtual wallet server to the checkout server, payment data comprising a proper subset of the characters from which the payment vehicle identifier can be inferred;
    receive a payment confirmation at the checkout server, confirming payment for the electronic payment transaction should be made using the payment vehicle;
    send payment confirmation to the virtual wallet server; and
    process payment for the shopping cart value using the payment vehicle.

Also disclosed herein is a computer process for making an electronic payment transaction, the computer process comprising the steps of:
    receiving a checkout request at a checkout server and enabling payment for the electronic payment transaction using a virtual wallet registered on a virtual wallet server, the virtual wallet comprising a payment vehicle having a payment vehicle identifier comprising a number of characters for uniquely identifying the payment vehicle;
    receiving a virtual wallet identifier at the virtual wallet server, the virtual wallet identifier identifying the virtual wallet;
    sending shopping cart details including a shopping cart value from the checkout server to the virtual wallet server;
    transmitting, from the virtual wallet server to the checkout server, payment data comprising a proper subset of the characters from which the payment vehicle identifier can be inferred;
    receiving a payment confirmation at the checkout server, confirming payment for the electronic payment transaction should be made using the payment vehicle;
    sending payment confirmation to the virtual wallet server; and
    processing payment for the shopping cart value using the payment vehicle.

Further disclosed herein is a computer system for making an electronic payment transaction, the system comprising an interface server in communication with:
  a checkout server; and
  a virtual wallet server,
  the interface server comprising:
    at least one processor; and
    at least one memory including computer program code,
      the computer program code being adapted to configure, with the at least one processor, the interface server to:
      receive an enablement request from the checkout server and forward the enablement request to the virtual wallet server, the enablement request being a request to enable use of a virtual wallet in making the electronic transaction;
      receive, from the virtual wallet server, parameters for displaying an enabled visual payment indicator on a consumer device and forward the parameters to the checkout server, the enabled visual payment indicator indicating the virtual wallet can be used in processing the electronic transaction;
      receive a virtual wallet identifier and shopping cart details from the checkout server, the virtual wallet identifier identifying a virtual wallet registered on the virtual wallet server and comprising a payment vehicle identified by a number of characters, the characters representing a payment vehicle identifier of the payment vehicle and the shopping cart details being details of a shopping cart to be purchased upon successful processing of payment for the electronic transaction, and forward the virtual wallet identifier and shopping cart details to the virtual wallet server;

receive, from the virtual wallet server, payment data comprising a proper subset of the characters from which the payment vehicle identifier can be inferred, and forward the payment data to the checkout server;

receive payment confirmation from the checkout server, the payment confirmation confirming payment for the electronic transaction should be made using the payment vehicle, and transmitting the payment confirmation to the virtual wallet server; and receive payment confirmation from the virtual wallet server, the payment confirmation confirming payment for the electronic transaction has been made using the payment vehicle, and forward the payment confirmation to the checkout server.

BRIEF DESCRIPTION OF THE DRAWINGS

Embodiments of the present teachings will be better understood and readily apparent to one of ordinary skill in the art from the following written description in conjunction with the drawings in which.

DETAILED DESCRIPTION

Figure 1:
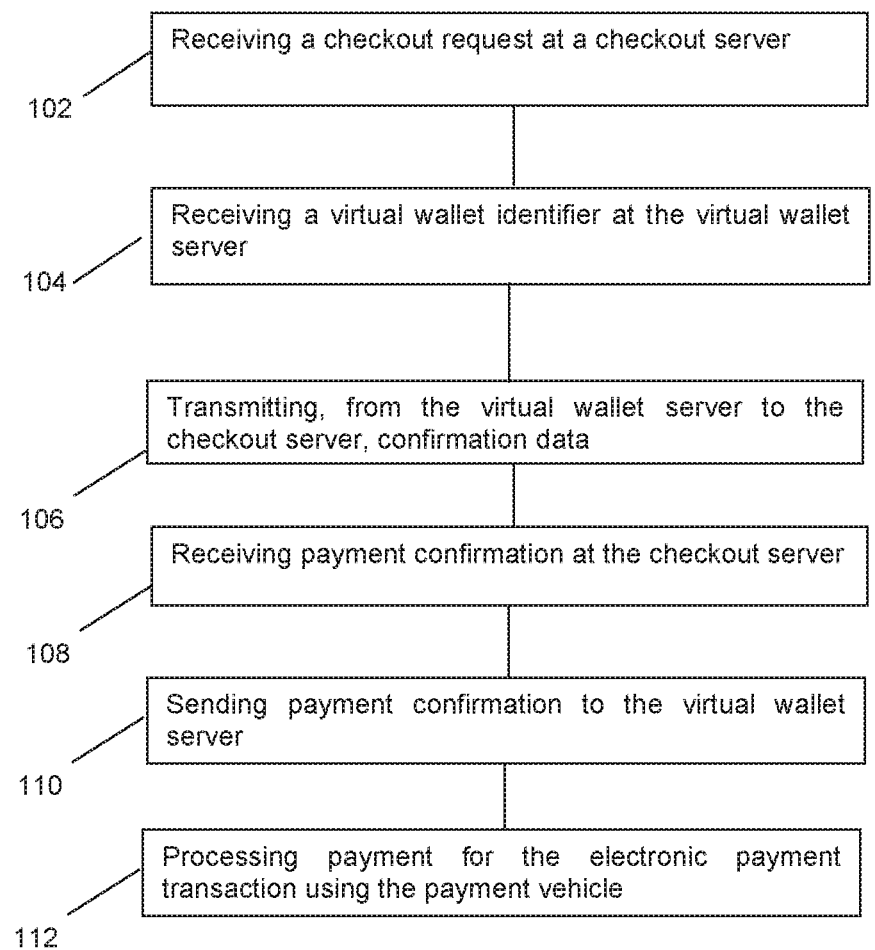
FIG. 1 shows a flow chart illustrating a method for performing an electronic payment transaction according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 shows a flow chart illustrating a method 100 for making an electronic payment transaction according to an example embodiment. The electronic payment transaction can involve the purchase of products or services in-store or online. The method broadly comprises:

Step 102: receiving a checkout request at a checkout server;

Step 104: receiving a virtual wallet identifier at a virtual wallet server;

Step 106: transmitting confirmation data from the virtual wallet server to the checkout server;

Step 108: receiving payment confirmation at the checkout server;

Step 110: sending payment confirmation to the virtual wallet server; and

Step 112: processing payment.

At step 102, the method 100 comprises receiving a checkout request through a checkout server and enabling payment for the electronic payment transaction using a virtual wallet registered on a virtual wallet server.

The checkout request comprises a virtual wallet type for identifying a provider of the virtual wallet. The type of virtual wallet is used to identify the particular virtual wallet server hosting the virtual wallet the consumer intends to use in the transaction, so that the request can be directed by the checkout server to the appropriate virtual wallet server. The virtual wallet type may be derivable from a virtual wallet identifier, such as a number associated with the virtual wallet.

The request may be sent from a merchant terminal. For in-store purchases the merchant terminal may comprise a point-of-sale (POS) terminal, a biometric scanner (e.g. fingerprint scanner), barcode scanner, kiosk or other device or devices. For online purchases the merchant terminal may comprise a customer's personal electronic device (e.g. laptop, computer or smartphone) on which a merchant app is operating, or that is being used to access the merchant's website through which purchases can be made.

The checkout request is sent to the checkout server, which may be in communication with, or host, a payment gateway displayed on the merchant terminal through which the request is made. The checkout request is then sent to the virtual wallet server so that the virtual wallet server can enable a particular virtual wallet for use in the transaction.

For example, a consumer may wish to purchase a product from a merchant in an online store accessible at the merchant's website—notably, a merchant may also be a merchant aggregator that provides a facility for multiple merchants to sell products or services online. The consumer selects the product on their smartphone, laptop, personal computer or other device, and initiates payment using a virtual wallet associated or registered with a virtual wallet server. The consumer proceeds to virtual checkout with the selected product through the merchant's website. The merchant's website is in communication with the checkout server such that proceeding to virtual checkout results in the checkout server displaying (on the merchant terminal or device) a payment gateway through which the transaction takes place. The checkout server is also in communication with the virtual wallet server. As such, when the consumer decides to checkout, a checkout request is sent from the merchant's website to the checkout server and from the checkout server to the virtual wallet server. The virtual wallet server then enables the checkout server to accept transactions using the consumer's virtual wallet. In another embodiment, the checkout server and the virtual wallet server may be a single server.

The checkout server may send the request to the virtual wallet server upon the consumer identifying the virtual wallet provider with whom they hold a virtual wallet—the host of the relevant virtual wallet server. The checkout server may alternatively provide a number of visual devices each of which represents a particular type of virtual wallet (e.g. payment marks). The visual devices may not be activated until the consumer selects a particular visual device, at which stage the checkout server knows the virtual wallet server to which to route the request. The virtual wallet server then enables the visual device.

In an alternative embodiment, once the virtual wallet is enabled for use, the checkout server may cause a payment mark to be displayed to the consumer. The payment mark indicates that the virtual wallet has been enabled for use in the transaction. The payment mark may be displayed on the payment gateway, merchant's website or app being viewed by the consumer.

At step 104, the method 100 comprises receiving a virtual wallet identifier at the virtual wallet server. The virtual wallet identifier identifies the virtual wallet. In other words, it is a reference the virtual wallet server can use to identify a virtual wallet account associated with the virtual wallet and thereby with the consumer. The virtual wallet account is associated with one or more payment vehicles having, or associated with, funds for settling the transaction.

Where the merchant terminal comprises an in-store terminal, that terminal may receive information (e.g. using near-field communication) from a virtual wallet app on the mobile device of the consumer, the virtual wallet app being provided by the virtual wallet provider. Thus, the virtual wallet identifier may then be sent once the consumer's device has sent the information to the merchant terminal to indicate that payment should be made using the particular virtual wallet. This may involve the consumer selecting the payment mark for the virtual wallet and then bringing their device near the merchant terminal to facilitate sending of the virtual wallet identifier from the mobile device to the merchant terminal. This may alternatively involve the merchant terminal affecting a virtual selection of the payment mark in response to the consumer bringing their device near the merchant terminal.

Where the merchant terminal is the consumer's device, the virtual wallet may automatically be available for use through payment gateways displaying the payment mark for that particular virtual wallet. In this case, selection of the payment mark results in the virtual wallet identifier being supplied by, or retrieved from, the virtual wallet app. The virtual wallet identifier is then sent to the virtual wallet server.

The checkout server may also send the shopping cart details to the virtual wallet server at this time. However, since the shopping cart details include the transaction or shopping cart value (i.e. the total purchase price of the shopping cart) it is often appropriate to send the shopping cart details at step 110. This is because the virtual wallet server may supply shipping details in response to selection of the payment mark. Shipping cost often depends on the location to which products are to be shipped, and thus the total value required to be paid to affect settlement will often not be known until step 108, and thus the total value will not be sent to the virtual wallet server until step 110.

At step 106, the method 100 comprises transmitting payment data from the virtual wallet server to the checkout server. The payment data comprises information necessary for performing the transaction, such as a payment vehicle identifier and shipping address details. For merchants compliant with online payment standards, the confirmation data can include the complete payment vehicle identifier. However, for non-compliant merchants the payment vehicle identifier should not be sent. In this case, it is recognised that payment vehicle identifiers comprise a string of characters. Thus transmitting confirmation data to a non-compliant merchant may comprise transmitting a proper subset of the characters making up the payment vehicle identifier. The proper subset of characters is intended to be sufficient for the payment vehicle identifier, as a whole, to be inferred by a consumer familiar with, or having access to, the payment vehicle from which the funds are to be debited. More specifically, the virtual wallet server in this step only sends part of the information that would typically be required to perform an electronic transaction—for example credit card details, to identify that the consumer wishes to use his credit card to transfer funds to the virtual wallet. The missing information may be represented by asterisks such that, for example, a credit card number 1234 5678 9101 1121 may be represented as 1234 ** ** 1121. In an example embodiment, the payment vehicle may be the consumer's bank account, a credit card or a debit card. In any event, the payment vehicle is a card or account linked to funds that can be used in the electronic transaction.

In order to affect step 106, the virtual wallet server uses the virtual wallet identifier to identify a virtual wallet associated with the consumer. Once the particular virtual wallet has been located, the virtual wallet server extracts payment vehicle details, shipping details and other desired information, from the virtual wallet. To this end, the virtual wallet and associated details—e.g. payment vehicle details, shipping details and personal details of the consumer—may be stored together in a database that can be queried by the virtual wallet server upon receipt of a virtual wallet identifier.

Once received at the checkout server the payment data is displayed to the user for confirmation of payment. The user is thus presented with a partial payment vehicle identifier, where the displayed part of the payment vehicle identifier is sufficient for the identifier as a whole to be inferred, and shipping details where necessary.

At step 108, the method 100 comprises receiving a payment confirmation at the checkout server. The payment confirmation confirms payment for the electronic payment transaction should be made using the payment vehicle. That confirmation may be a confirmation that the consumer has selected a "Submit" or "Pay Now" button on the merchant's website or payment gateway indicating the transaction should be made using the payment vehicle associated with the partially displayed payment vehicle identifier. Confirmation in any event comprises selection of a button indicating the consumer agrees to use a particular payment vehicle as the means for funding the electronic transaction.

The confirmation is forwarded from the checkout server to the virtual wallet server at step 110. Either previously, at step 104, or presently at step 110, the virtual wallet server is also provided with shopping cart details such as the value of the shopping cart and a merchant identifier for identifying the merchant. The virtual wallet server then knows the value of the electronic transaction (i.e. that of the shopping cart, including shipping and other costs) the merchant to whom funds should be sent and the full payment vehicle details of the payment vehicle from which funds are to be debited to settle the transaction.

At step 112, the method 100 comprises processing payment for the electronic payment transaction using the payment vehicle in response to receipt of the payment confirmation. Processing payment comprises affecting settlement in the standard manner for digital wallets. For example, the virtual wallet server may communicate the value of the transaction and payment vehicle details to an acquirer of the payment vehicle used in the transaction. The acquirer then forwards those details, via a payment scheme, to the issuer of the payment vehicle. The issuer confirms the availability of sufficient funds to fund the transaction, which confirmation travels back through the payment scheme and acquirer to the checkout server that displays the payment confirmation to the consumer, indicating the transaction has been successful.

Use of the term "server" herein may be understood to mean a single computing device or a plurality of interconnected computing devices which operate together to perform a particular function. That is, the server may be contained within a single hardware unit or be distributed among several different hardware units. Moreover, multiple servers and parties (e.g. merchant, acquirer, payment scheme and issuer) identified above may be the same server or party, and all such variations are intended to fall within the scope of the present disclosure. An exemplary computing device which may be operated as a server is described below with reference to FIG. 6.

Figure 2:
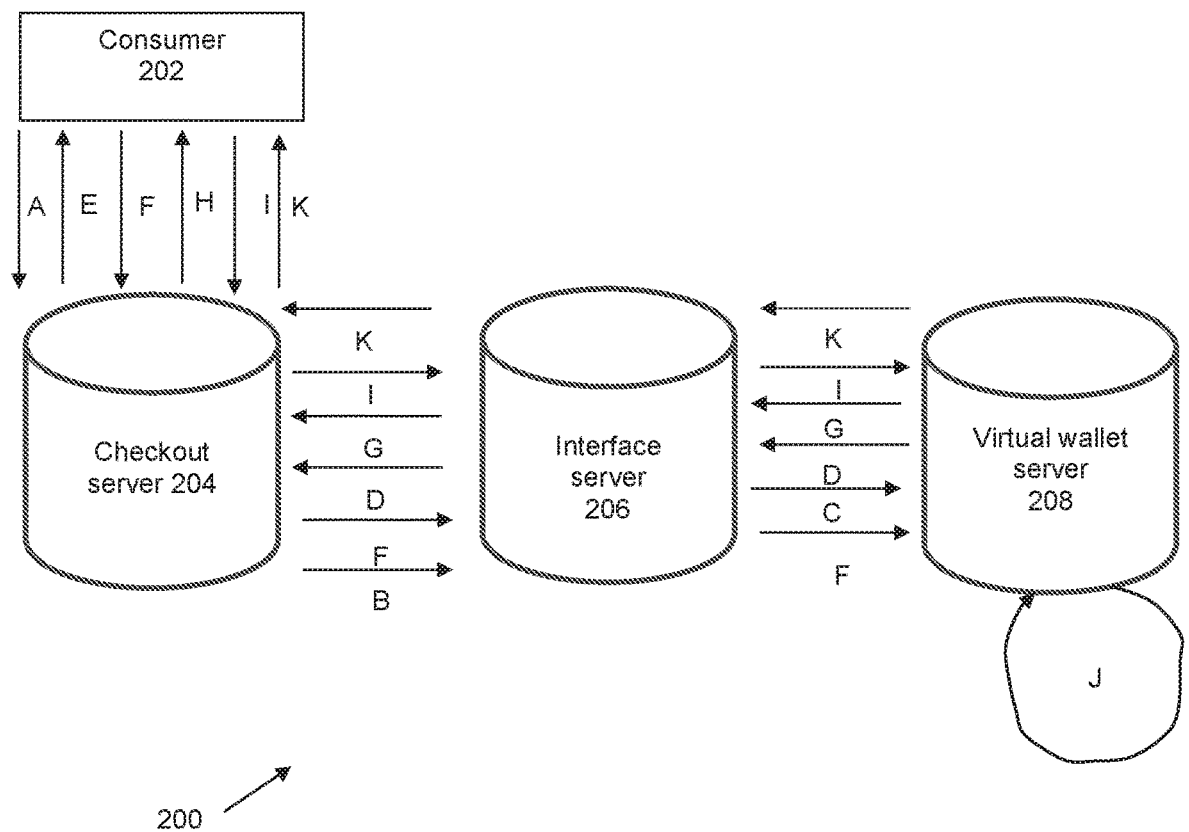
FIG. 2 shows a schematic diagram illustrating the flow of information in a system in an electronic payment transaction according to an example embodiment.

FIG. 2 shows a schematic diagram illustrating the flow of information in a system 200 in an electronic payment transaction according to an example embodiment. In this figure, the electronic payment transaction involves a consumer device 202, a checkout server 204, an interface server device 206 and a virtual wallet server 208. The checkout server 204 may be in communication with, or host, a payment gateway such that the consumer device 202 can transmit payment information to the checkout server 204 for payment of the electronic payment transaction. In the embodiment, the checkout server 204 is communicatively coupled (i.e. in communication with, whether wired or wirelessly so) with the interface server device 206 so that the checkout server 204 and interface server device 206 are able to electronically transmit data between one another. Similarly, the interface server device 206 is communicatively coupled with the virtual wallet server 208 so that the interface server device 206 and virtual wallet server 208 are able to electronically transmit data between one another. The interface server device 206 may be a server application programming interface (SAPI). In an example embodiment, the checkout server 204, interface server device 206 and the virtual wallet server 208 may be a single server located at a common location. In other example embodiments, the interface server device 206 comprises a separate server for mapping the requirements of checkout server 204 to those of virtual wallet server 208. Thus each of the servers 204, 206, 208 may be different servers.

At step A, the checkout server 204 receives a checkout request from the consumer device 202. At this step, the merchant's website or app is accessed by the consumer's device 202 (e.g. smartphone, personal computer or laptop) and the website or app receives, from the consumer's device 202, selection of one or more products or services for purchase. The one or more products or services are added to the shopping cart and checkout is initiated by receiving selection of a virtual checkout button on the merchant's website or app. The checkout server 204, which is in communication with the merchant's website or app, generates the checkout request. The checkout request may comprise at least one or more of: merchant credentials, information on the one or more selected products or services, selection of a particular virtual wallet by the consumer and an initialization or enablement request—the initialization or enablement request is a request to enable a particular virtual wallet for use in the purchase of the one or more products or services. For example, groceries are added to a shopping cart through the consumer device 202. Checkout is then ready to be initiated and the consumer device 202 indicates payment should be made using a MasterPass virtual wallet (e.g. by receiving a consumer selection of a button indicating that the MasterPass virtual wallet, once enabled, can be used for settling the transaction). This indication is sent to the checkout server 204.

At step B, the checkout server 204 sends the initialisation or enablement request to the interface server device 206 which, at step C, forwards the initialisation or enablement request to the virtual wallet server 208.

The virtual wallet server 208 responds by sending, via the interface server device 206, to the checkout server 204 parameters (e.g. codes, links, and program code) necessary for the checkout server 204 to display an enabled visual indicator (e.g. payment mark)—Step D. The checkout server then displays the enabled visual indicator on the consumer device 202—step E. The display of the payment mark may be on the merchant's website, a payment gateway or on an application on the consumer device 202.

At step F, the consumer device 202 sends confirmation that payment should be made using the virtual wallet, by indicating the visual indicator has been selected. Selection of the visual indicator results in the confirmation being sent to the virtual wallet server 208 via the checkout server 204, confirming payment should be made using the virtual wallet. The virtual wallet server 208 processes the payment for the consumer's purchases and advises that payment has been successful or unsuccessful.

To achieve step F, the checkout server receives a virtual wallet identifier with selection of the visual indicator, and transmits checkout data to the interface server device 206. The interface server device 206 then forwards the checkout data, or a subset of the checkout data including the virtual wallet identifier, to the virtual wallet server. The checkout data comprises the virtual wallet identifier and may also comprise the shopping cart details (e.g. total basket value, contents of basket etc) and merchant credentials. The merchant credentials may include a unique identifier comprising a string of characters to uniquely identify the merchant. The interface server 206 may be integrated with the merchant's shopping cart application such as Magneto, Woocommerce and Prestashop.

Different merchants may use a wide variety of shopping cart applications which may be difficult to integrate with the virtual wallet server 208. This may be due to the different programming languages used in the different shopping cart applications that the virtual wallet server 208 is not configured to recognize. The steps of reconfiguring the virtual wallet server 208 to recognize the different programming languages of the shopping cart applications may be complicated. The interface server device 206 can overcome this problem by providing an interface that maps the requirements of one or more shopping cart applications to those of one or more virtual wallet providers without having extensions to be included in the virtual wallet server 208 to accommodate different programming languages, data structures, variations in content and the like. Advantageously, this reduces the burden on the virtual wallet server 208 that would otherwise need to be configured to recognize and communicate with the various shopping card applications.

With further regard to step F, the interface server device 206 may store the checkout data in memory accessible by the checkout server 206 and send the data to the virtual wallet server 208, when needed, to enable payment for the shopping cart. To achieve this, the interface server device 206 may generate and send the checkout data in the form of a request token (comprising the virtual wallet identifier) to the virtual wallet server 208. The request token can be used by the virtual wallet server to uniquely identify the consumer with whom the virtual wallet is associated. The virtual wallet server 208 receives the request token and confirms that the consumer has an account registered with the virtual wallet provider and stored in a database accessible by the virtual wallet server 208.

At step G, the virtual wallet server 208 transmits payment data to the checkout server 204, via the interface server device 206. The payment data comprises a proper subset of the characters constituting the payment vehicle identifier of the payment vehicle associated with funds for making the transaction. The proper subset is sufficient for the remainder (i.e. those characters not in the proper subset) of the payment vehicle identifier to be inferred. For example, the virtual wallet may extract a credit card number of a credit card to be used in making the transaction. The credit card number may be stored in association with the card code verification (CCV), the card expiry date and the card holder's name in a database accessible to the virtual wallet server 208. The virtual wallet server 208 sends a proper subset of the extracted credit card number to the checkout server 204. The proper subset of the credit card number may comprise the first 4 digits, the last 4 digits and the CCV of the credit card so the user can identify the particular card to be used. In another example embodiment, the payment vehicle may be the consumer's bank account from which funds can be debited for settling the transaction. The virtual wallet server 208 in this case will send a proper subset of the digits constituting the consumer's bank account number. For example, the virtual wallet server 208 may send the first and last 4 characters of the bank account number to the checkout server 204 for display to the consumer. In current virtual wallet systems, the virtual wallet requires personal information, such as full credit card details (i.e. the complete credit card number), to be sent to the checkout server 204 for display through the merchants app, website or on the payment gateway hosted by the checkout server 204 and used by the merchant. This similarly requires the checkout server 204 to be compliant with industry standards. The merchant using the checkout server 204 may not wish to maintain compliance. The merchant may therefore be unable to receive sensitive personal details such as credit card numbers. Embodiments of the methods described herein can eliminate the need to send full personal details of the consumer or their credit card, and instead send a proper subset of the details required to facilitate the transaction using a virtual wallet.

The payment data may comprise a personal identification number such as a social security number or a personal account number (PAN). The personal identification number may comprise a string of characters, such that the virtual wallet server 208 need only transmit a proper subset of those characters to the checkout server 204 for display to the consumer, in order for the consumer to infer the remainder of those characters. More specifically, the proper subset may comprise the first six characters and last four characters of the PAN or social security number.

The payment data may further comprise the consumer's shipping address and other details as may be necessary to populate the fields of the payment gateway in order to affect the transaction.

Upon receipt of the payment data, the checkout server 204 sends the payment data to the consumer device 202 for display to the consumer—Step H. The consumer may be presented with shipping options for delivery of products to an address of the consumer. The consumer device 202 then sends to the checkout server 204 the selected shipping option (e.g. desired postal address, expediency of post, etc), if applicable, and confirmation that payment should be made using the payment vehicle (e.g. selection of a Buy or Pay Now button)—Step I. The checkout server 204 then sends payment confirmation to the virtual wallet server 208 via the interface server 206.

The payment confirmation confirms that payment should be made using the relevant payment vehicle. The payment confirmation may also comprise the shopping cart or a receipt or transaction number associated with the transaction, and a transaction value being the total price for purchase of the products, any shipping costs and other costs.

Once payment confirmation is received at the virtual wallet server 208, the virtual wallet server 208 processes payment using the consumer's predetermined payment vehicle for the electronic payment transaction as provided in the virtual wallet—Step J. Any appropriate settlement process may be used for settling the transaction.

Once payment is processed, the virtual wallet server 208 may send to the checkout server 204, via the interface server device 206, confirmation that payment has been made (or declined as the case may be)—Step K. Thereafter, the interface server device 206 transmits the confirmation to the consumer device 202 via the checkout server 204 that checkout and payment are complete. The checkout server 204 at the merchant may also store the products the consumer 202 has purchased in a database coupled with the checkout server 204.

Figure 3:
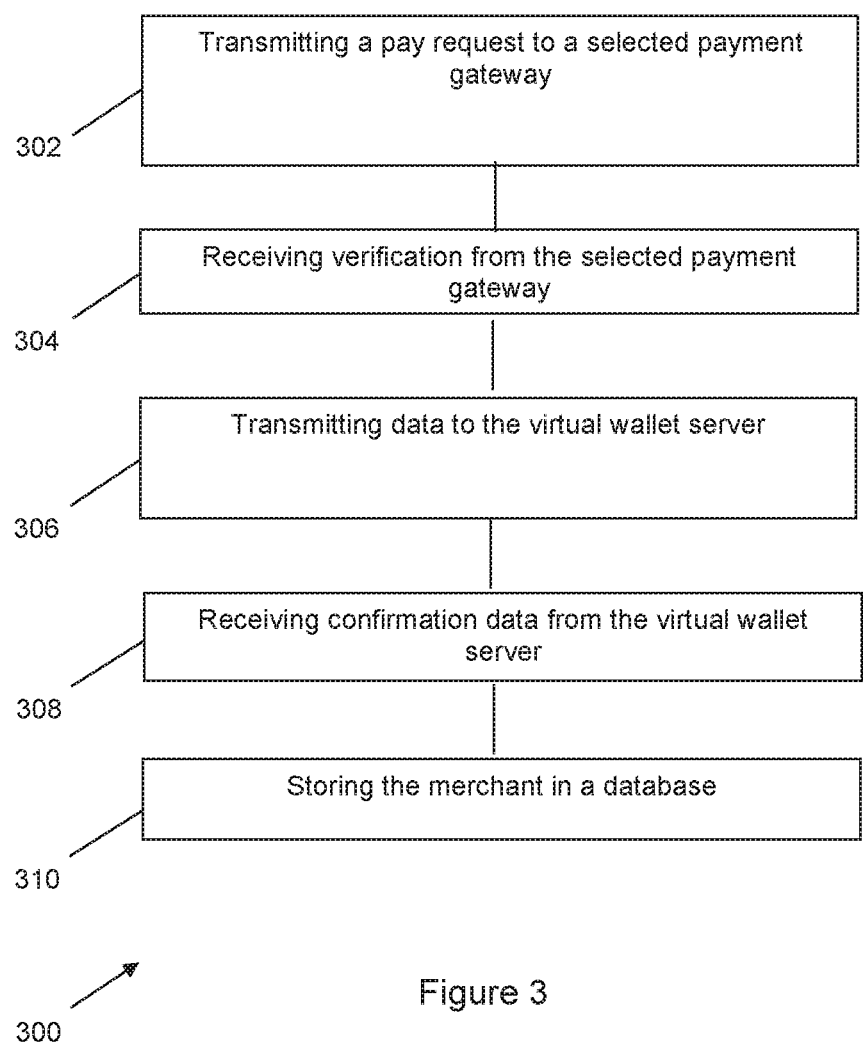
FIG. 3 shows a flow chart illustrating a method for a one-time registration of a merchant in an electronic payment transaction according to an example embodiment.

FIG. 3 shows a flow chart illustrating a method 300 for registration of a merchant for making an electronic payment transaction according to an example embodiment. At step 302, the method 300 comprises transmitting identification data to the merchant's payment gateway, the identification data comprising information for uniquely identifying the merchant. The merchant's payment gateway may be hosted by the merchant or may be a payment gateway with which the merchant is registered for use.

At step 304, the method 300 comprises receiving verification from the payment gateway that the merchant is legitimate (i.e. is a merchant registered to use the particular payment gateway). At step 306, the method 300 comprises transmitting data to the virtual wallet server, the data being configured to facilitate registration of the merchant. That data may comprise a merchant identifier to uniquely identify the merchant such as a company or business registration number. At step 308, the method 300 comprises receiving confirmation from the virtual wallet server confirming registration of the merchant with the virtual wallet server. At step 310, the method 300 comprises saving the merchant in a database of the interface server.

The method 300 may be performed at the time the checkout request is sent from the checkout server to the virtual wallet server (Steps B and C of FIG. 2). Thus the merchant may be registered at the time the transaction is desired to be made. This can enable the merchant to only remain registered for the purpose of performing a single transaction. In other words, after settlement or declination of the transaction the merchant may be deregistered from the virtual wallet server database. Alternatively, registration may be one-time registration such that, once registered, the merchant may remain registered for an indefinite period, or a predetermined period, as necessary.

Figure 4:
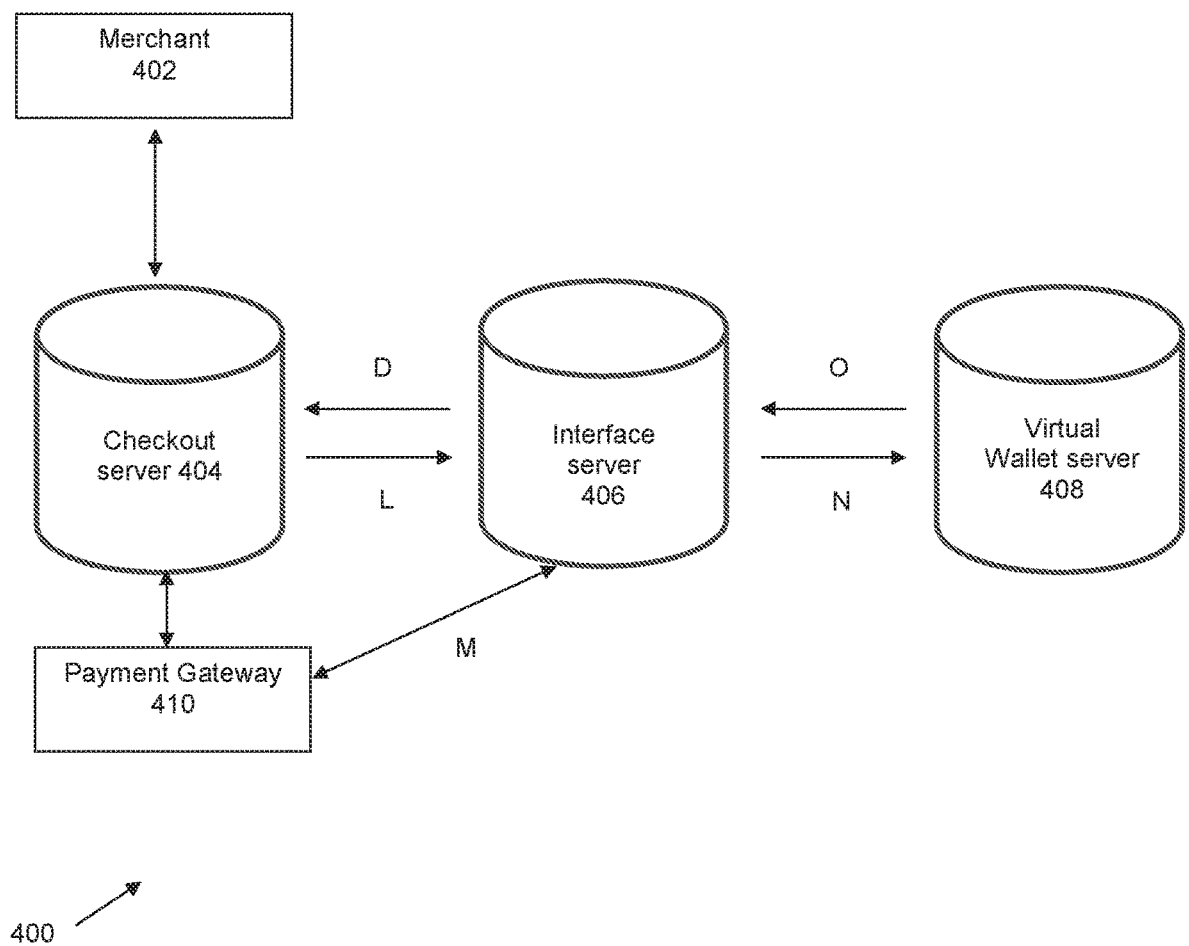
FIG. 4 shows a schematic diagram of a system for a one-time registration of a merchant in an electronic payment transaction in an example embodiment.

FIG. 4 shows a schematic diagram of a system for a one-time registration of a merchant in an electronic payment transaction in an example embodiment. In this figure, the electronic payment transaction involves a merchant 402, a checkout server 404, an interface server 406, a virtual wallet server 408 that is associated with a virtual wallet and a payment gateway 410 that is associated with (e.g. hosted on) the checkout server 404. The checkout server 404 is further associated with the merchant 402 and may be located at the merchant's premises. For example, a point-of-sale (POS) terminal at the merchant may be communicatively coupled to the checkout server 404 so that the POS terminal and the checkout server 404 are able to electronically transmit data between one another, so that data received by the POS terminal can be used to populated the necessary information fields in the payment gateway. The merchant 402 may be a Payment Card Industry Data Security Standard (PCI) compliant merchant or a non-PCI compliant merchant.

At step L, the merchant 402 requests for a one-time registration with the virtual wallet server 408—this is called merchant onboarding. The merchant 402 transmits identification data to the interface server 406 via the checkout server 404. The identification data may include the merchant's 402 profile information such as business address, business name and business code to uniquely identify the merchant 402. The identification data may also comprise details for using the selected payment gateway 410, including the payment gateway application programming interface (API) credentials. At step M, the interface server 406 transmits a simple pay request to the selected payment gateway 410 for verification (the payment gateway 410 may be hosted on the checkout server 404 as discussed with reference to FIG. 2). The interface server 406 may have a predetermined list of requirements for multiple payment gateways such that there is seamless transmission of identification data to the selected payment gateway 410 by screening the data to provide that which the particular payment gateway requires. The interface server 406 receives verification from the payment gateway that the merchant 402 is legitimate. The interface server 406 may store the verification and the merchant 402 details in a database associated with the interface server 406.

Subsequently, at step N, the interface server 406 transmits data to the virtual wallet server 408 to facilitate registration of the merchant 402 with the virtual wallet server 408. At step O, the interface server 406 receives confirmation from the virtual wallet server 408 that the merchant 402 has been successfully registered onto the virtual wallet server 408. The virtual wallet server 408 also transmits to the interface server 406 a unique identifier to identify the particular merchant 402. The interface server 406 stores the unique identifier in a database and transmits confirmation to the checkout server 404 to confirm the merchant 402 has successfully registered with the virtual wallet server 408. The confirmation may comprise the unique identifier transmitted from the virtual wallet server 408. Embodiments described herein may have the advantage of simple and easy integration between the merchant's checkout server 404 and the virtual wallet server 408. The one-time registration of the merchant 402 as described in embodiments of the claimed invention may be quick and hassle-free since there is no transmission of invitation codes for registration, and any merchant that can uniquely identify itself may be capable of registration for transaction using virtual wallets without the need to provide a PCI-compliant checkout process.

Figure 5:
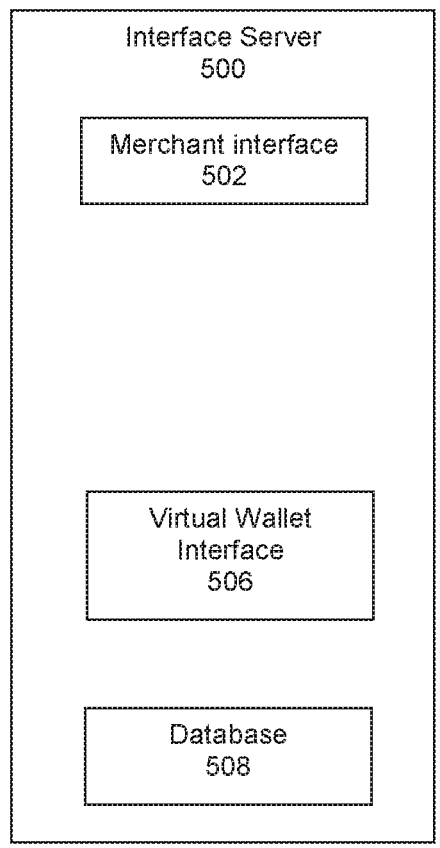
FIG. 5 shows a schematic diagram of a network-based system for use in an electronic payment transaction in an example embodiment.

FIG. 5 shows a schematic diagram of an interface server for use in an electronic payment transaction in an example embodiment. The interface server 500 comprises a merchant interface 502, a virtual wallet interface 506 and a database 508. The merchant interface 502 is configured to enable the interface server 500 to communicate with the checkout server associated with a merchant. The merchant interface 502 further allows transmission and collection of data between the checkout server and the interface server 500. The virtual wallet interface 506 is configured to cause the interface server 500 to communicate with the virtual wallet server and allows transmission and collection of data between the virtual wallet server and the interface server 500. The database 508 is configured to store data collected from the payment gateway, the checkout server and the virtual wallet server. The data may include unique identifier of a merchant during the one-time registration process as described in FIG. 4, shopping cart details transmitted from the checkout server and confirmation data from the virtual wallet server as described in FIG. 2.

Figure 6:
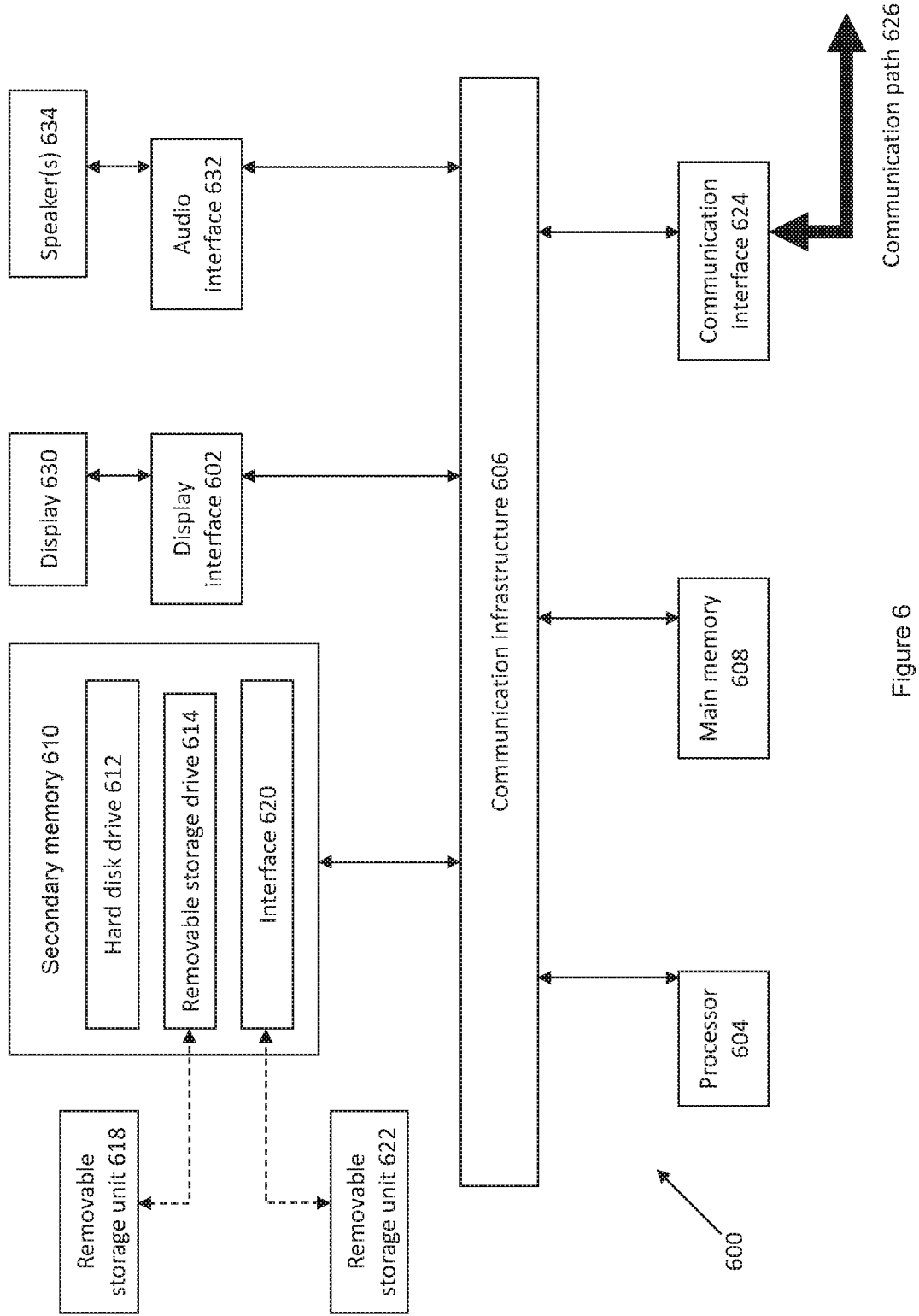
FIG. 6 shows a schematic diagram of a computer system suitable for use in an example embodiment.

FIG. 6 depicts an exemplary computing device 600, hereinafter interchangeably referred to as a computer system 600, where one or more such computing devices 600 may be used to (at least partially) implement the interface server 500 and similarly one or both of the checkout server and virtual wallet server. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a hard disk drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage unit 618 in a well-known manner. The removable storage unit 618 may include magnetic tape, optical disk, non-volatile memory storage medium, or the like, which is read by and written to by removable storage drive 614. As will be appreciated by persons skilled in the relevant art(s), the removable storage unit 618 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 620. Examples of a removable storage unit 622 and interface 620 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 620 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1393, RJ35, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634. For example, the display interface may display available virtual wallets to a user for selection in order for the checkout server to generate a checkout request. The display interface may display visual indicators such as payment marks confirmation of successful transactions.

As used herein, the term "computer program product" may refer, in part, to removable storage unit 618, removable storage unit 622, a hard disk installed in hard disk drive 612, or a carrier wave carrying software over communication path 626 (wireless link or cable) to communication interface 624. Computer readable storage media refers to any non-transitory tangible storage medium that provides recorded instructions and/or data to the computing device 600 for execution and/or processing. Examples of such storage media include magnetic tape, CD-ROM, DVD, Blu-Ray™ Disc, a hard disk drive, a ROM or integrated circuit, a solid state drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the hard disk drive 612, or the interface 620. Alternatively, the computer program product may be downloaded to the computer system 600 over the communications path 626. The software, when executed by the processor 604, causes the computing device 600 to perform functions of embodiments described herein.

Where the computing device 600 comprises the interface server 500 for making an electronic payment transaction, the communication interface 624 and associated communication path 626 may be similar to each of the merchant interface 502 and the virtual wallet interface 506 as shown in FIG. 5.

For example, the merchant interface 502 may include the communication interface 624 that communicates with the merchant or checkout server via communication path 626. Similarly, the virtual wallet interface 506 may communicate with the virtual wallet server using the communication interface 624. The database 508 may include the removable storage unit 618, 622 or the removable storage drive 614.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts.

It will be appreciated that the elements illustrated in FIG. 6 function to provide means for performing the various functions and operations of the servers as described in the above embodiments. For example, the computing device 600 provides an apparatus for making an electronic payment transaction as described with reference to FIG. 1, the apparatus comprising: at least one processor 604, at least one memory 608 including a computer program code and at least one communication interface 624.

In the case where an apparatus 600 is the interface server, the at least one memory 608 and the computer program code are further configured to cause the processor 604 to identify the type of shopping cart or payment gateway platform used by the merchant—such as Magneto, Woocommerce and Prestashop. The processor 604 may also extract information from which the consumer can be identified and send that information to the virtual wallet server to obtain details of a payment vehicle to be used in making the transaction.

By providing the method and system for an electronic payment transaction of the claimed invention as described herein, merchants may not bear the cost and burden for PCI compliance by receiving sensitive data. Thus, cost savings may be realized. Further, there may be an easier and less complicated process for the registration of a new merchant onto the virtual wallet as it eliminates the requirement of invitation codes for registration. The built-in interface of the present invention may also allow plug-ins of popular shopping cart applications to be easily integrated with the virtual wallet, which may further save time and costs for the merchants.

It will be appreciated by a person skilled in the art that numerous variations and/or modifications may be made as shown in the specific embodiments without departing from the spirit or scope of the invention as broadly described. The present embodiments are, therefore, to be considered in all respects to be illustrative and not restrictive.

The invention claimed is:

1. A computer system for making an electronic payment transaction, the system comprising:
   a checkout server; and
   a virtual wallet server;
   the checkout server and virtual wallet server each comprising:
      at least one processor; and
      at least one memory including computer program code;
   the computer program code of the checkout server and the virtual wallet server collectively configure the computer system to, with the respective at least one processor:
   receive, at the checkout server, a checkout request;
   transmit, from the checkout server to the virtual wallet server, an enablement request to enable a virtual wallet registered on the virtual wallet server for use for the electronic payment transaction;
   in response to the enablement request, enable, by the virtual wallet server, payment for the electronic payment transaction using the virtual wallet registered on the virtual wallet server, the virtual wallet comprising a payment vehicle having a payment vehicle identifier comprising a number of characters for uniquely identifying the payment vehicle;
   receive a virtual wallet identifier at the virtual wallet server, the virtual wallet identifier identifying the virtual wallet;
   send shopping cart details including a shopping cart value from the checkout server to the virtual wallet server;
   transmit, from the virtual wallet server to the checkout server, payment data comprising a proper subset of the characters from which the payment vehicle identifier can be inferred;
   receive a payment confirmation at the checkout server, confirming payment for the electronic payment transaction should be made using the payment vehicle;
   send payment confirmation to the virtual wallet server; and
   process, by the virtual wallet server, payment for the shopping cart value using the payment vehicle.

2. A computer system according to claim 1, wherein, to enable payment, the computer system displays a payment mark associated with the virtual wallet server, selection of which confirms payment using the virtual wallet.

3. A computer system according to claim 2, further comprising a merchant terminal, the merchant terminal being configured to:
   send the checkout request to the checkout server; and
   display the payment mark.

4. A computer system according to claim 3, wherein receiving a payment confirmation comprises receiving confirmation of selection of the payment mark from the merchant terminal.

5. A computer system according to claim 1, the checkout server further being configured to receive a one-time registration of a merchant.

6. A computer process for making an electronic payment transaction, the computer process comprising the steps of:
   receiving a checkout request at a checkout server;
   transmitting, from the checkout server to a virtual wallet server, an enablement request to enable a virtual wallet registered on the virtual wallet server for use for the electronic payment transaction;
   in response to the enablement request, enabling, by the virtual wallet server, payment for the electronic payment transaction using the virtual wallet registered on a virtual wallet server, the virtual wallet comprising a payment vehicle having a payment vehicle identifier comprising a number of characters for uniquely identifying the payment vehicle;
   receiving a virtual wallet identifier at the virtual wallet server, the virtual wallet identifier identifying the virtual wallet;
   sending shopping cart details including a shopping cart value from the checkout server to the virtual wallet server;
   transmitting, from the virtual wallet server to the checkout server, payment data comprising a proper subset of the characters from which the payment vehicle identifier can be inferred;

receiving a payment confirmation at the checkout server, confirming payment for the electronic payment transaction should be made using the payment vehicle;

sending payment confirmation to the virtual wallet server; and processing, by the virtual wallet server, payment for the shopping cart value using the payment vehicle.

7. The computer process as claimed in claim 6, wherein enabling payment comprises displaying a payment mark associated with the virtual wallet server, selection of which confirms payment using the virtual wallet.

8. The computer process as claimed in claim 7, wherein receiving a payment confirmation comprises receiving confirmation of selection of the payment mark.

9. The computer process as claimed in claim 6, wherein the payment data further comprises a personal identification number.

10. The computer process as claimed in claim 9, wherein the personal identification number comprises a subset of characters of a social security number or a personal account number (PAN).

11. The computer process as claimed in claim 10, wherein the personal identification number comprises a string of characters and the subset further comprises the first six characters and last four characters of the personal account number.

12. The computer process as claimed in claim 6, wherein the computer process further comprises a one-time registration of a merchant associated with the checkout server.

13. The computer process as claimed in claim 6, wherein the computer process further comprises registration of a merchant for receiving payment for the electronic payment transaction, the merchant being associated with the checkout server.

14. The computer process as claimed in claim 12, wherein one-time registration of a merchant comprises the steps of:

transmitting a pay request to a selected payment gateway for verification of the merchant, wherein the identification data comprises information for uniquely identifying the merchant;

receiving verification from the selected payment gateway;

transmitting data to the virtual wallet server, wherein the data is configured to facilitate registration of the merchant;

receiving confirmation data from the virtual wallet server for registration of the merchant; and saving the merchant in a database of the interface server.

15. The computer process as claimed in claim 14, wherein the identification data further comprises details of the selected payment gateway, including the payment gateway application programming interface (API) credentials.

16. The computer process as claimed in claim 14, wherein receiving verification from the selected payment gateway comprises receiving data that is configured to indicate that the merchant is legitimate.

17. A computer process for making an electronic payment transaction, the computer process comprising the steps of:

receiving a checkout request at a checkout server and enabling payment for the electronic payment transaction using a virtual wallet registered on a virtual wallet server, the virtual wallet comprising a payment vehicle having a payment vehicle identifier comprising a number of characters for uniquely identifying the payment vehicle:

registering a merchant for receiving payment for the electronic payment transaction, the merchant being associated with the checkout server;

receiving a virtual wallet identifier at the virtual wallet server, the virtual wallet identifier identifying the virtual wallet;

sending shopping cart details including a shopping cart value from the checkout server to the virtual wallet server, transmitting, from the virtual wallet server to the checkout server, payment data comprising a proper subset of the characters from which the payment vehicle identifier can be inferred;

receiving a payment confirmation at the checkout server, confirming payment for the electronic payment transaction should be made using the payment vehicle;

sending payment confirmation to the virtual wallet server;

processing payment for the shopping cart value using the payment vehicle; and de-registering the merchant after processing payment for the electronic transaction.

18. The computer process as claimed in claim 6, wherein enabling payment occurs in response to receiving the checkout request.

19. The computer process as claimed in claim 6, wherein the step of sending shopping cart details from the checkout server to the virtual wallet server occurs simultaneously with the step of receiving a virtual wallet identifier at the virtual wallet server.

* * * * *